(12) United States Patent
Kaita et al.

(10) Patent No.: US 11,637,346 B2
(45) Date of Patent: Apr. 25, 2023

(54) MOUNTING STRUCTURE FOR BATTERY PACK IN VEHICLE

(71) Applicant: TOYOTA JIDOSHA KABUSHIKI KAISHA, Aichi-ken (JP)

(72) Inventors: Keiji Kaita, Miyoshi (JP); Shingo Aijima, Susono (JP); Yusuke Suzuki, Nagakute (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 114 days.

(21) Appl. No.: 17/167,083

(22) Filed: Feb. 4, 2021

(65) Prior Publication Data
US 2021/0242524 A1    Aug. 5, 2021

(30) Foreign Application Priority Data
Feb. 5, 2020    (JP) .............................. JP2020-017924

(51) Int. Cl.
*B60L 50/64* (2019.01)
*H01M 50/249* (2021.01)
*B60K 1/04* (2019.01)
*H01M 50/242* (2021.01)
*B60L 50/60* (2019.01)

(52) U.S. Cl.
CPC .............. *H01M 50/242* (2021.01); *B60K 1/04* (2013.01); *B60L 50/64* (2019.02); *B60L 50/66* (2019.02); *H01M 50/249* (2021.01); *B60K 2001/0438* (2013.01); *H01M 2220/20* (2013.01)

(58) Field of Classification Search
CPC .... B60K 2001/0422; B60K 2001/0433; B60K 2001/0438; H01M 50/242; H01M 50/249; B60L 50/64; B60L 50/66
See application file for complete search history.

(56) References Cited

U.S. PATENT DOCUMENTS

| | | | |
|---|---|---|---|
| 7,614,469 B2 * | 11/2009 | Kumar .............. | H01M 10/0413 180/68.5 |
| 9,156,340 B2 * | 10/2015 | van den Akker ........ | B60K 1/04 |
| 9,281,505 B2 * | 3/2016 | Hihara ................ | H01M 8/1083 |
| 9,490,460 B2 * | 11/2016 | Yanagi .................. | H01M 50/20 |
| 9,758,029 B2 * | 9/2017 | Hokazono ................ | B60K 1/04 |
| 10,476,061 B1 * | 11/2019 | Groebl ..................... | B60L 50/60 |

(Continued)

FOREIGN PATENT DOCUMENTS

| | | |
|---|---|---|
| JP | 2001236937 A | 8/2001 |
| JP | 2007237779 A | 9/2007 |

(Continued)

*Primary Examiner* — Katy M Ebner
(74) *Attorney, Agent, or Firm* — Hauptman Ham, LLP (57) ABSTRACT

A battery pack installing a floor of a vehicle includes one or more battery cells, a battery pack case in which the one or more battery cells are disposed, and a cushioning member arranged to be sandwiched between the one or more battery cells and the floor or between the one or more battery cells and the battery pack case, by fixing the battery pack case to the floor. Then, the first cushioning member may be configured such that a first area farther from suspension mounts is configured to a first elastic modulus, and the second area closer to the suspension mounts than the first area is configured to a second elastic modulus lower than the first elastic modulus.

8 Claims, 7 Drawing Sheets

(56) References Cited

U.S. PATENT DOCUMENTS

| | | | |
|---|---|---|---|
| 11,208,155 B2* | 12/2021 | Aitharaju | B60R 19/023 |
| 2008/0136110 A1* | 6/2008 | He | B60K 1/04 |
| | | | 277/316 |
| 2009/0173558 A1 | 7/2009 | Watanabe et al. | |
| 2013/0327583 A1* | 12/2013 | Nitawaki | B60L 3/0046 |
| | | | 180/68.5 |
| 2015/0135939 A1* | 5/2015 | Rawlinson | B60R 16/04 |
| | | | 89/36.08 |
| 2017/0057556 A1* | 3/2017 | Vollmer | B60L 50/64 |
| 2019/0036093 A1 | 1/2019 | Mueller et al. | |
| 2019/0275873 A1* | 9/2019 | Kasai | B60L 50/66 |
| 2020/0101879 A1* | 4/2020 | Sakai | B60N 2/015 |
| 2020/0227706 A1* | 7/2020 | Kuno | B60K 1/04 |
| 2021/0237550 A1* | 8/2021 | Kawase | B60L 50/66 |
| 2022/0118839 A1* | 4/2022 | Amaanan | H01M 50/249 |
| 2022/0176788 A1* | 6/2022 | Persson | H01M 50/249 |

FOREIGN PATENT DOCUMENTS

| | | | | |
|---|---|---|---|---|
| JP | 2008277058 | A | | 11/2008 |
| JP | 2009193942 | A | | 8/2009 |
| JP | 5061941 | B2 | | 10/2012 |
| JP | 2014107241 | A | | 6/2014 |
| JP | 2017196959 | A | * | 11/2017 |
| JP | 2017196959 | A | | 11/2017 |
| JP | 201991605 | A | | 6/2019 |

* cited by examiner

MOUNTING STRUCTURE FOR BATTERY PACK IN VEHICLE

CROSS-REFERENCE TO RELATED APPLICATION

The present application claims priority under 35 U.S.C. § 119 to Japanese Patent Application No. 2020-017924, filed Feb. 5, 2020, the contents of which application are incorporated herein by reference in their entirety.

BACKGROUND

Field

The present disclosure relates to a mounting structure for a battery pack having a plurality of battery cells in vehicle.

Background

JP 2019-091605A discloses a technique related to a protection structure of a battery pack disposed under a floor of a vehicle. The protection structure of this technique includes a battery pack frame disposed so as to surround a side surface of the battery pack, a pair of left and right under-reinforcement extending in the vehicle longitudinal direction in the vehicle width direction outside of the battery pack, and a brace connecting one and the other of the vehicle width direction outside of the battery pack frame in the vehicle width direction. According to the configuration of this technique, when a collision from the side of the vehicle occurs, the collision load input to the under-reinforcement is transmitted to the anti-collision side through the battery pack frame and the under-brace. Thus, since the collision load input from the side surface is dispersed to the anti-collision side, it is possible to reduce the load applied to the battery pack.

SUMMARY

Since a large capacity battery pack accommodates a plurality of battery cells therein, there is a tendency that the size also increases. Further, in recent technology, there is a tendency to increase the size of each battery cell also in response to a request for improvement of the energy density and cost reduction of the battery pack. It is not easy to fix such a large capacity battery pack in a limited vehicle space while ensuring high reliability. Since the above-described prior art does not assume mounting a large battery cell, there is room for improvement in terms of ensuring reliability of the battery pack against vibration and impact.

The present disclosure has been made in view of the problems as described above, and an object thereof is to provide a mounting structure for a battery pack in vehicle capable of mounting the battery pack having a plurality of battery cells with a simple configuration while ensuring high reliability.

To solve the above problems, the first disclosure is applied to a mounting structure for a battery pack in vehicle, the battery pack installing a floor of a vehicle. The battery pack includes one or more battery cells, a battery pack case in which the one or more battery cells are disposed, and a cushioning member arranged to be sandwiched between the one or more battery cells and the floor or between the one or more battery cells and the battery pack case, by fixing the battery pack case to the floor.

The second disclosure has the following further features in the first disclosure.

The vehicle has one or more suspension mounts. The cushioning member includes a first area, and a second area closer to the one or more suspension mounts than the first area. The cushioning member is configured such that a rigidity of the second area is lower than a rigidly of the first area.

The third disclosure further has the following features in the second disclosure.

The cushioning member is configured in a rectangular shape extending in a front-back direction of the vehicle and a width direction of the vehicle. The first area is an area including at least an entire area in the front-back direction in a central portion of the width direction. The second area is an area including at least four corners of the rectangular shape.

The fourth disclosure has the following features in the second or third disclosure.

The cushioning member is configured such that an elastic modulus of a material in the first area is different from an elastic modulus of a material in the second area.

The fifth disclosure has the following features in the second or third disclosure.

The cushioning member includes a plurality of grooves or holes in at least the second area. The cushioning member is configured such that an average density of the second area is lower than an average density of the first area.

The sixth disclosure has the following features in any one of the first to fifth disclosures.

The battery pack case includes a lower case in which the plurality of battery cells are arranged side by side, and an upper case for isolating a space in which the plurality of battery cells in the lower case are arranged. The cushioning member is disposed between the upper case and the plurality of battery cells. The battery pack is fixed so that the upper case faces the floor.

The seventh disclosure has the following features in any one of the first to sixth disclosures.

The floor has one or more suspension mounts. The battery pack is configured in a rectangular shape in a bottom view of the vehicle. The structure for mounting of the vehicle includes a fixing structure for fixing a marginal part of the battery pack to the floor. The marginal part includes a first marginal part, and a second marginal part farther from the one or more suspension mounts than the first marginal part. The fixing structure is configured such that a fixing strength of the first marginal part is lower than a fixing strength of the second marginal part.

The eighth disclosure has the following features in any one of the first to seventh disclosures.

The plurality of battery cells are disposed with a gap between each other in a front-back direction of the vehicle.

The ninth disclosure has the following features in any one of the first to seventh disclosures.

The plurality of battery cells are arranged stacked in an up-down direction of the vehicle.

According to the first disclosure, the cushioning member is arranged to be sandwiched between the one or more battery cells and the floor or between the one or more battery cells and the battery pack case, by fixing the battery pack case to the floor. Thus, it is possible to absorb dimensional tolerances of the one or more battery cells, it is possible to reliably fix the one or more battery cells in a simple configuration while ensuring high reliability.

According to the second disclosure, the cushioning member is configured such that the rigidity of the second area closer to the suspension mount is lower than that of the first area farther from the suspension mount than the second area. According to such a configuration, the first area having high rigidity securely fixes the one or more battery cells, and the torsional load of the floor can be effectively released by the cushioning member of the second area having a lower rigidity than the first area. Thus, it is possible to suppress the distortion of the battery cell, which contributes to improvement in reliability.

According to the third disclosure, the entire area of the central portion in the width direction of the cushioning member is a first area configured with high rigidity. This ensures that all of the battery cells are fixed, and the torsional load of the floor can be effectively released by the cushioning member of the second area configured with low rigidity.

According to the fourth disclosure, the elastic modulus of the second area can be made relatively lower than the elastic modulus of the first area by using a material having a different elastic modulus for the first area and the second area.

According to the fifth disclosure, by providing a plurality of grooves or holes in the second area, the rigidity of the second area can be made relatively lower than the rigidity of the first area.

According to the sixth disclosure, the plurality of battery cells and the cushioning member are isolated by the battery pack case including the lower case and the upper case. As a result, the plurality of battery cells can be effectively protected from entry of moisture from the outside or the like. Further, since the plurality of battery cells and the cushioning member is sandwiched by the lower case and the upper case, it is possible to stably fix the plurality of battery cells.

According to a seventh disclosure, the fix structure is configured such that the fixing strength of the first marginal part closer to the suspension mounts is lower than the fixing strength of the second marginal part farther from the suspension mounts than the first marginal part. This makes it possible to reduce a portion of the torsional load transmitted from the floor to the battery pack, thereby enabling one or more battery cells to be effectively protected.

According to the eighth disclosure, the plurality of battery cells are disposed with a gap between each other in a front-back direction of the vehicle. As a result, it is possible to cope with the deterioration and expansion of the plurality of battery cells.

According to the ninth disclosure, the plurality of battery cells are arranged stacked in an up-down direction of the vehicle. This makes it possible to increase the size of each battery cell.

DETAILED DESCRIPTION

Hereinafter, embodiments of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiment is not necessarily essential to the present disclosure unless explicitly described otherwise, or unless the present disclosure is explicitly specified by the structures, steps or the like theoretically.

1. First Embodiment

The first embodiment will be described with reference to the accompanying drawings.

1-1. Summary of Vehicle

Figure 1:
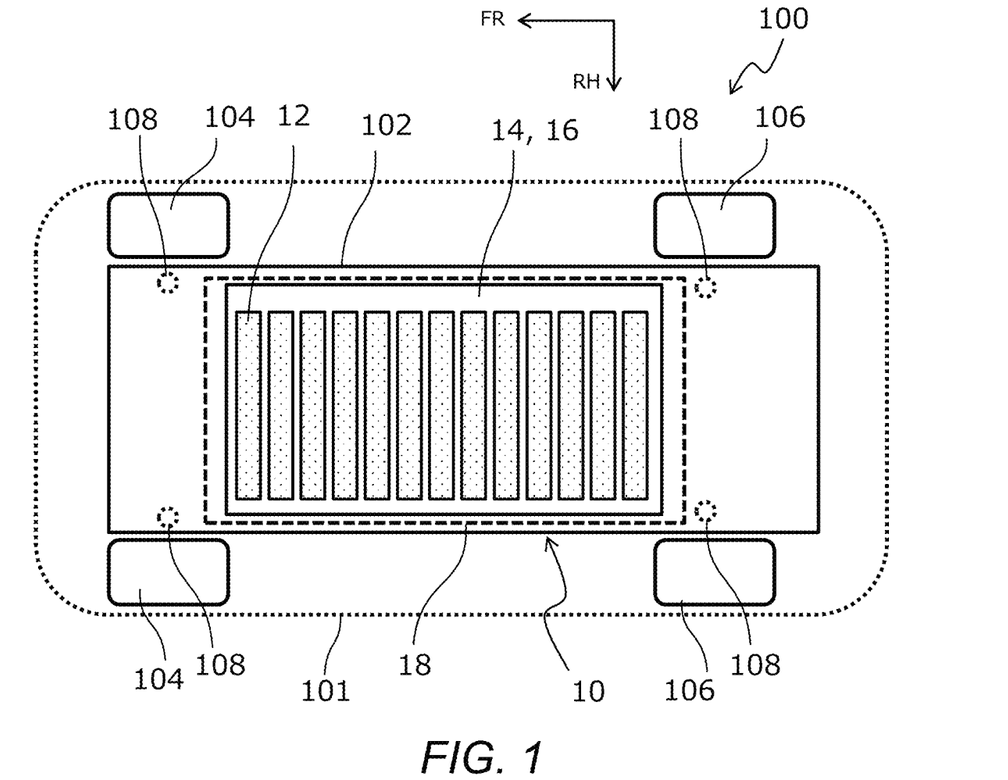
FIG. 1 is a diagram schematically showing a mounting structure for a battery pack in vehicle according to the first embodiment.
Figure 2:
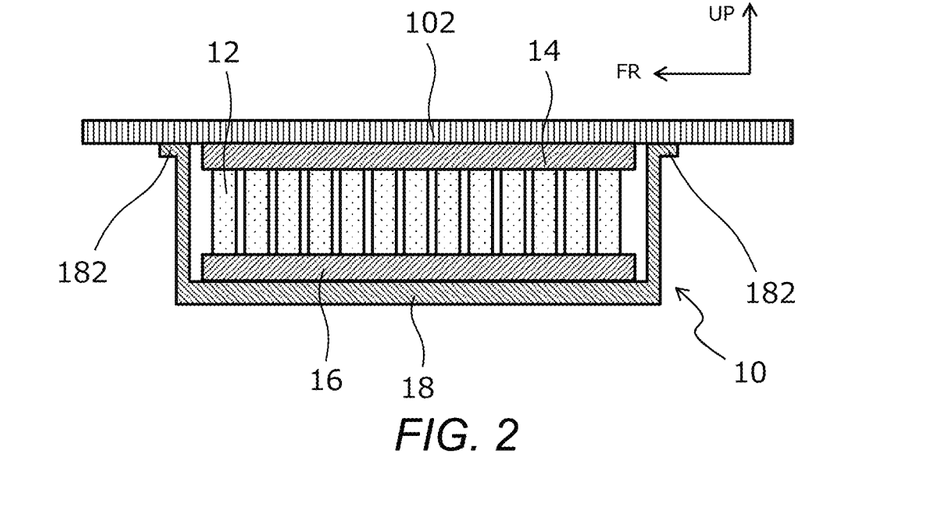
FIG. 2 is a side view of a floor and a battery pack cut in a front-back direction, showing the battery pack mounted under the floor of the vehicle of the first embodiment.

FIG. 1 is a diagram schematically showing a mounting structure for a battery pack in vehicle according to the first embodiment. FIG. 1 shows a perspective view of the inside of a vehicle 100 from the underside of the vehicle. FIG. 2 is a side view of the floor and the battery pack cut in a front-back direction, showing the battery pack mounted under the floor of the vehicle of the first embodiment. The vehicle 100 is an electric vehicle using an electric motor as a power source. The electric motor is operated by the supply of electric power. The vehicle 100 includes a battery pack 10 which stores electric power to be supplied to the electric motor.

The vehicle 100 includes a vehicle body 101, a front wheel 104, and a rear wheel 106. The vehicle body 101 includes a floor panel (floor) 102 and suspension mounts 108. A load from the front wheel 104 and the rear wheel 106 is input to the suspension mounts 108, respectively.

1-2. Mounting Structure for Battery Pack in Vehicle

The battery pack 10 is installed under the floor panel 102 constituting the vehicle body 101 of the vehicle 100. The battery pack 10 is disposed between the wheel base of the front wheel 104 and the rear wheel 106 in a front-back direction of the vehicle 100. The battery pack 10 is installed in the floor panel 102 in a form that can be replaced as necessary.

Here, the front-back direction of the vehicle 100 is defined as a front-back direction of the battery pack 10, a width direction of the vehicle 100 is defined as a width direction of the battery pack 10, an up-down direction of the vehicle 100 is defined as an up-down direction of the battery pack 10. In addition, the arrow FR shown in each figure indicates forward in the front-back direction of the battery pack 10, the arrow UP shown in each figure indicates upward in the up-down direction of the battery pack 10, and the arrows RH shown in each figure indicates rightward from the viewpoint of an occupant in the vehicle. Also, the opposite direction of each arrow FR, UP, and RH indicates a backward of the battery pack 10, a downward of the battery pack 10, and a leftward (LH) of the battery pack 10. Hereafter, when simply using front-back, left-right, up-down to describe the direction, unless otherwise noted, indicates the front-back direction of the battery pack 10, left-right in the width direction of the battery pack 10, the up-down direction of the battery pack 10.

The battery pack 10 includes a plurality of battery cells 12, a first cushioning member 14, a second cushioning member 16, and a battery pack case 18. The battery cell 12 is a rechargeable battery configured in a substantially rectangular parallelepiped shape. The battery cell 12 is housed in the battery pack 10 in a direction in which a longitudinal direction is aligned with the width direction, a shortitudinal direction is aligned with the up-down direction, and the thickness direction is aligned with the front-back direction. Typically, the battery pack 10 uses about 100 pieces of the battery cells, for example, about 1 m on width, 10 cm to 15 cm in height, and 15 mm to 20 mm in thickness in the front-back direction. The size of the battery cell 12 in the width direction is about 80% of a tread width of the vehicle 100.

The battery pack case 18 forms an outer shell of the battery pack 10. The battery pack case 18 is made of, for example, a steel plate. The battery pack case 18 is configured in a rectangular shape in a bottom view of the vehicle 100. The plurality of battery cells 12 are arranged side by side on a floor surface of the battery pack case 18 with a gap each other in the front-back direction. According to the layout of such the plurality of battery cells 12, dimension of the plurality of battery cells 12 in the front-back direction is configured to about 2 m.

The first cushioning member 14 and the second cushioning member 16 is a rectangular plate-shaped cushioning material extending in the width direction and the front-back direction. The first cushioning member 14 and the second cushioning member 16 are preferably made of an elastic body made of rubber, sponge, or the like, but may be rigid body. The first cushioning member 14 and the second cushioning member 16 are configured to be large enough to cover all of the plurality of arranged battery cells 12 from an upper side or a down side in the up-down direction and to be housed in the battery pack case 18. The first cushioning member 14 is sandwiched between the plurality of arranged battery cells 12 and the floor panel 102. The second cushioning member 16 is laid on the floor surface of the battery pack case 18, and the plurality of battery cells 12 is fixed to on an upper surface side of the second cushioning member 16 by an adhesive at equal intervals. A flange 182 is formed around the battery pack case 18. By fastening the flange 182 of the battery pack case 18 to the floor panel 102 by fastener members, the battery pack case 18 is fixed under the floor of the floor panel 102. The joint portion between the battery pack case 18 and the floor panel 102, a sealing material such as a gasket is sandwiched. As a result, the storage space of the plurality of battery cells 12, formed by the battery pack case 18 and the floor panel 102, is kept airtight and liquid-tight from the external space.

1-3. Features of Mounted Structure in Vehicle of First Embodiment

The battery pack 10 of the first embodiment does not adopt a configuration in which the plurality of battery cells 12 are stacked and constrained in a stack shape, taking into account the reduction in the number of parts and the degradation and expansion of the battery cells 12 in the front-back direction. For this reason, the battery pack 10 of the first embodiment requires the mounting structure for fixing each of the plurality of battery cells 12 individually at predetermined intervals.

The battery pack 10 of the first embodiment adopt a structure in which the first cushioning member 14 is sandwiched between the upper side in the up-down direction of the plurality of battery cells 12 and the second cushioning member 16 is sandwiched between the down side in the up-down direction of the plurality of battery cells 12. Specifically, by fixing the battery pack case 18 under the floor of the floor panel 102, the plurality of battery cells 12 are fixed by being sandwiched between the first cushioning member 14 and the second cushioning member 16. According to the mounting structure in vehicle, the plurality of battery cells 12 are firmly fixed by pressing force in the up-down direction from the first cushioning member 14 and the second cushioning member 16. This make it possible to increase the reliability of the battery pack 10 against vibration when the vehicle 100 is running. In addition, the dimensional tolerances of the plurality of battery cells 12 are absorbed by the first cushion member 14 and the second cushion member 16. It is possible to prevent the fixing failure due to variations in the battery cell 12. According to the mounting structure for the battery pack 10 of the first embodiment, it is possible to mount the plurality of battery cells 12 in the vehicle without forming a stack shape by restraining the plurality of battery cells 12 in the front-back direction.

1-3. Modification of Mounting Structure for Battery Pack in Vehicle

The mounting structure of the battery pack 10 in vehicle of the first embodiment may be modified as described below.

Although several modified examples will be described below, these modified examples may have a structure in which they are appropriately combined.

1-3-1. First Modification

Figure 3:
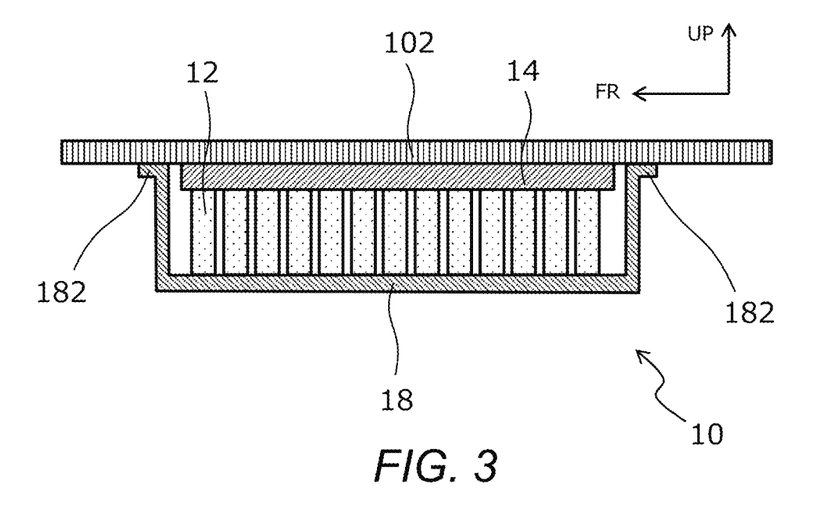
FIG. 3 is a side view of the floor and the battery pack cut in a front-back direction, showing a first modification of the mounting structure for the battery pack in vehicle of the first embodiment.

FIG. 3 is a side view of the floor and the battery pack cut in a front-back direction, showing a first modification of the mounting structure for the battery pack in vehicle of the first embodiment. As shown in FIG. 3, the battery pack 10 may not include the second cushioning member 16 as long as it includes at least the first cushioning member 14. In this case, the plurality of battery cells 12 are directly fixed to the floor surface of the battery pack case 18 by the adhesive. When the battery pack case 18 is fixed under the floor of the floor panel 102, the plurality of battery cells 12 are sandwiched and fixed between the first cushioning member 14 and the floor panel 102. In such a configuration, it is possible to fix the plurality of battery cells 12 by the pressing force in the up-down direction received from the first cushioning member 14 and the floor panel 102.

The battery pack 10 may not include the first cushioning member 14 as long as it includes at least the second cushioning member 16. In this case, the plurality of battery cells 12 are directly fixed to the second cushioning member 16 disposed on the floor surface of the battery pack case 18 by the adhesive. When the battery pack case 18 is fixed under the floor of the floor panel 102, the plurality of battery cells 12 are sandwiched and fixed between the second cushioning member 16 and the floor panel 102. In such a configuration, it is possible to fix the plurality of battery cells 12 by the pressing force in the up-down direction received from the second cushioning member 16 and the floor panel 102.

1-3-2. Second Modification

Figure 4:
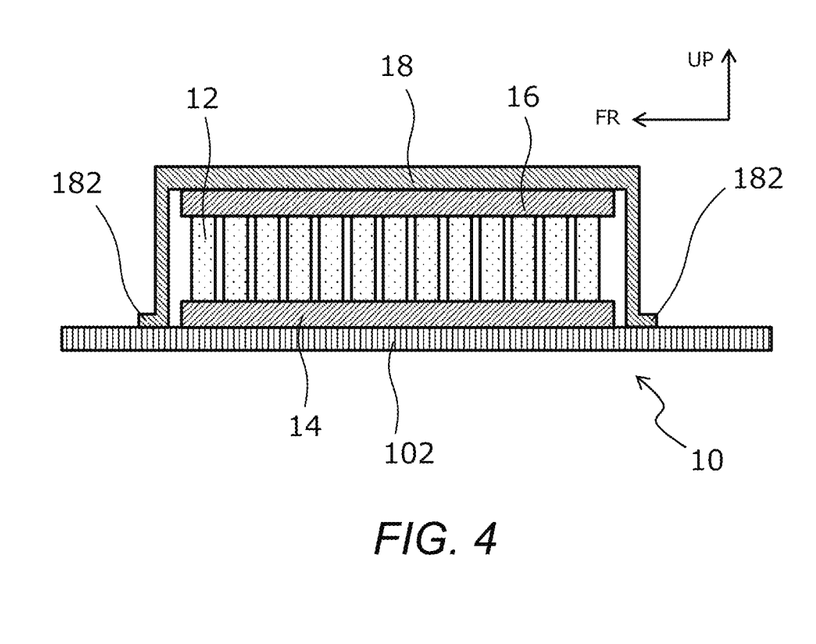
FIG. 4 is a side view of the floor and the battery pack cut in a front-back direction, showing a second modification of the mounting structure for the battery pack in vehicle of the first embodiment.

FIG. 4 is a side view of the floor and the battery pack cut in a front-back direction, showing a second modification of the mounting structure for the battery pack in vehicle of the first embodiment. As shown in FIG. 4, the battery pack 10 may be configured to be fixed on the floor of the floor panel 102. According to such a mounting structure in vehicle, although there is a problem that the space in the vehicle is narrowed, the battery pack 10 can be a structure that is not exposed to the outside.

1-3-3. Third Modification

Figure 5:
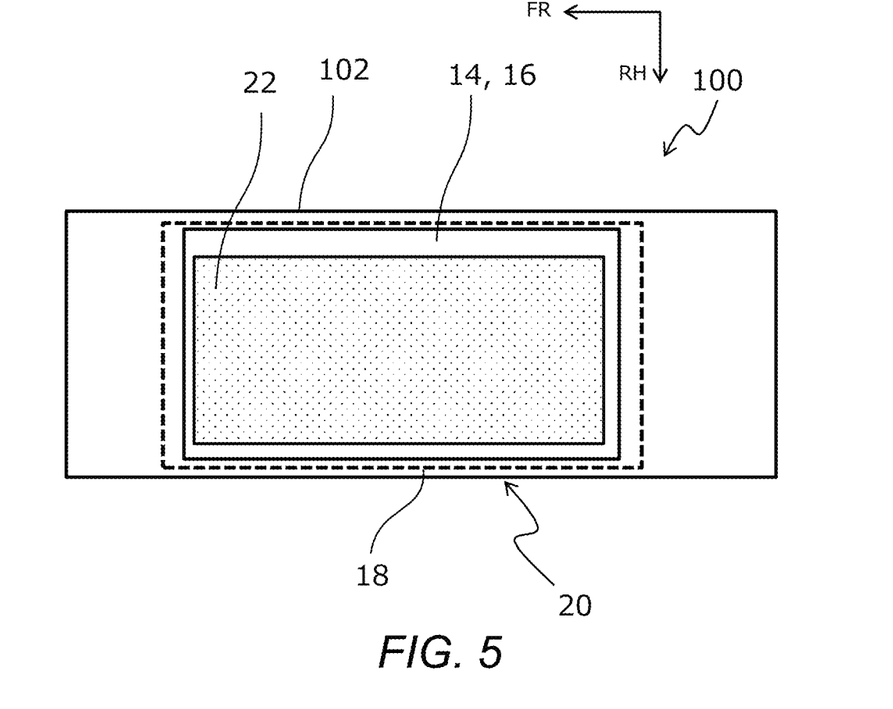
FIG. 5 is a bottom view of the floor and the battery pack perspective from a bottom side, showing a third modification of the mounting structure for the battery pack in vehicle of the first embodiment.
Figure 6:
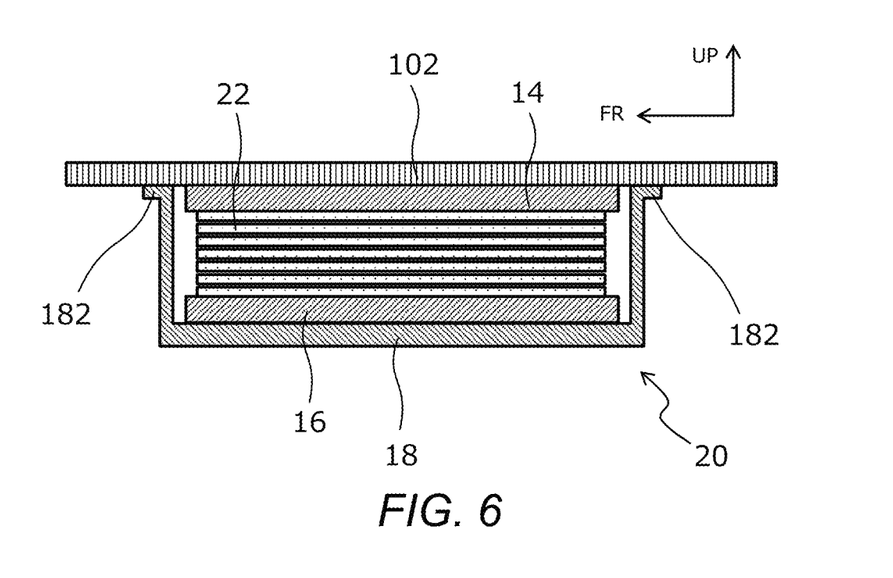
FIG. 6 is a side view of the floor and the battery pack cut in a front-back direction, showing a third modification of the mounting structure for the battery pack in vehicle of the first embodiment.

FIG. 5 is a bottom view of the floor and the battery pack perspective from the bottom side, showing a third modification of the mounting structure for the battery pack in vehicle of the first embodiment. FIG. 6 is a side view of the floor and the battery pack cut in a front-back direction, showing a third modification of the mounting structure for the battery pack in vehicle of the first embodiment. In FIGS. 5 and 6, a thin flat plate-shaped battery cell 22 in the battery pack 20 is housed by stacking in the up-down direction. The battery cell 22 is a large battery cell, for example, about 2 m in size in the front-back direction and about 1 m in the width direction. The mounting structure of the battery pack 10 of the first embodiment described above can also be applied to the battery pack 20 described above.

1-3-4. Fourth Modification

Figure 7:
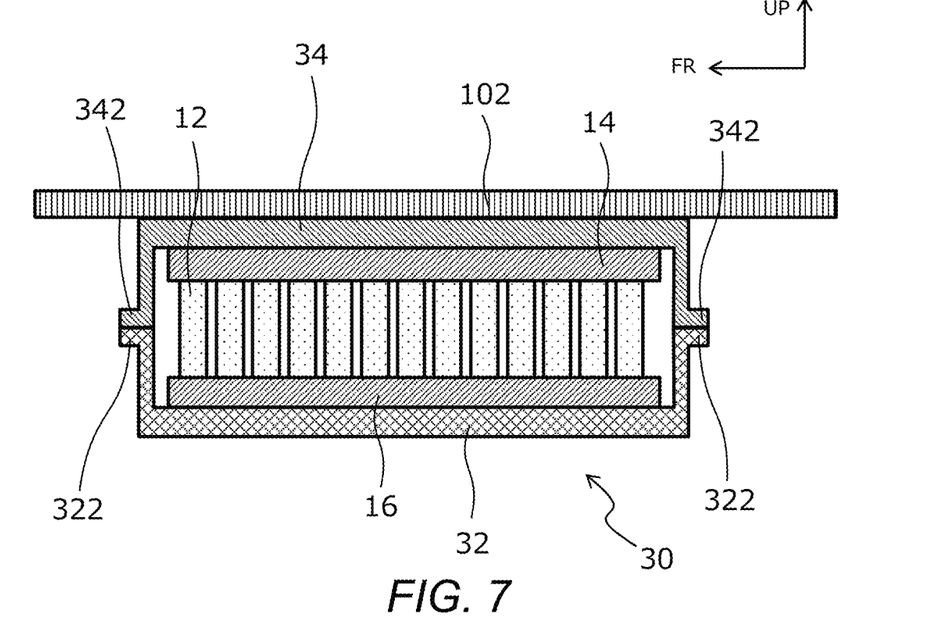
FIG. 7 is a side view of the floor and the battery pack cut in a front-back direction, showing a fourth modification of the mounting structure for the battery pack in vehicle of the first embodiment.

FIG. 7 is a side view of the floor and the battery pack cut in a front-back direction, showing a fourth modification of the mounting structure for the battery pack in vehicle of the first embodiment. The battery pack 30 shown in FIG. 7 includes a lower case 32 located on the lower side and the upper case 34 located on the upper side as a component constituting the outer shell corresponding to the battery pack case 18 of the battery pack 10 shown in FIG. 2. The lower case 32 and the upper case 34 is made of, for example, steel plate, constituting an outer shell of the battery pack 30.

A flange 322 is formed around the periphery of the lower case 32. Similarly, the flange 342 is formed around the upper case 34. The upper case 34 is fixed to the lower case 32 by aligning the flange 342 of the upper case 34 with the flange 322 of the lower case 32 and fastening both by fastener members. As a result, the internal space formed by the lower case 32 and the upper case 34 is isolated.

The plurality of battery cells 12, the first cushioning member 14, and the second cushioning member 16 are accommodated in an internal space formed by the lower case 32 and the upper case 34. Configuration and arrangement of the plurality of battery cells 12, the first cushioning member 14, and the second cushioning member 16 is the same as the battery pack 10 of the first embodiment. The battery pack 30 is fixed so that the upper case 34 faces the lower floor of the floor panel 102.

According to such a configuration, it is possible to form a sealed space for accommodating the plurality of battery cells 12 by the lower case 32 and the upper case 34 without using the floor surface of the floor panel 102. Also, because of the structure of fixing the plurality of battery cells 12 by the lower case 32 and the upper case 34, the plurality of battery cells 12 can be securely fixed even when the floor surface of the floor panel 102 is not flat.

1-3-5. Fifth Modification

Figure 8:
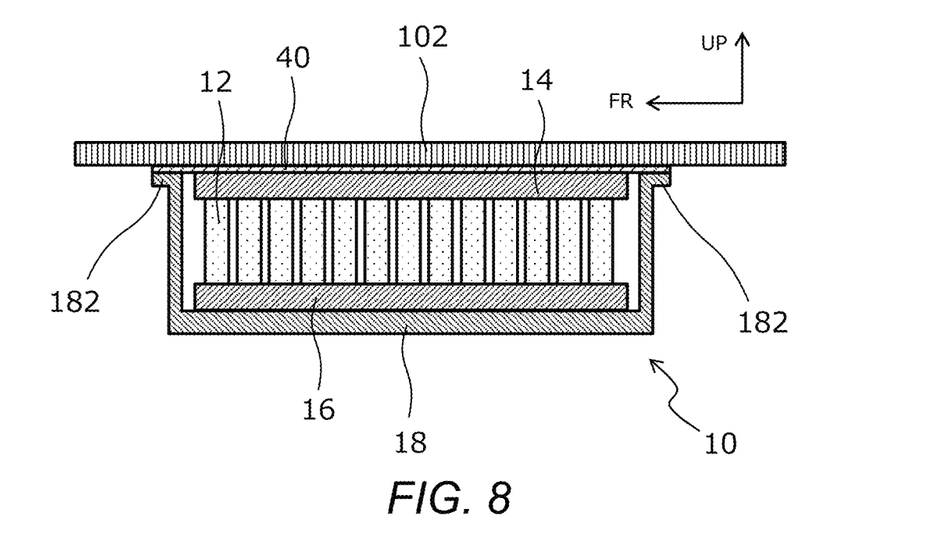
FIG. 8 is a side view of the floor and the battery pack cut in a front-back direction, showing a fifth modification of the mounting structure for the battery pack in vehicle of the first embodiment.

FIG. 8 is a side view of the floor and the battery pack cut in a front-back direction, showing a fifth modification of the mounting structure for the battery pack in vehicle of the first embodiment. The battery pack 10 shown in FIG. 8 has a feature in a configuration in which a cover 40 is sandwiched between the battery pack case 18 and the floor panel 102 of the battery pack 10 shown in FIG. 2. The cover 40 may be made of, for example, light metal plate, resin plate, or steel plate. According to such a configuration, even when the floor surface is not flat, it is possible to reliably seal the space for accommodating the plurality of battery cells 12 by the battery pack case 18 and the cover 40.

1-3-6. Sixth Modification

Figure 9:
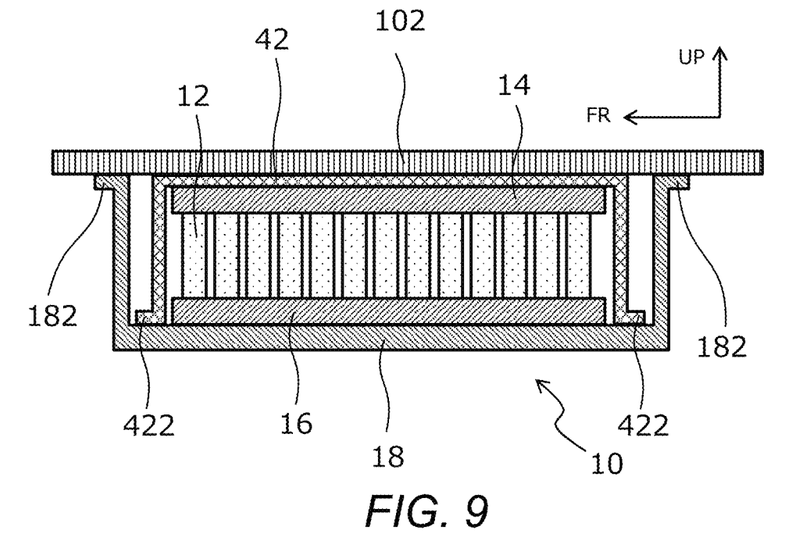
FIG. 9 is a side view of the floor and the battery pack cut in a front-back direction, showing a sixth modification of the mounting structure for the battery pack in vehicle of the first embodiment.

FIG. 9 is a side view of the floor and the battery pack cut in a front-back direction, showing a sixth modification of the mounting structure for the battery pack in vehicle of the first embodiment. The battery pack 10 shown in FIG. 9 has a feature in a configuration having an inner cover 42 covering the periphery of the plurality of battery cells 12 inside the battery pack case 18 of the battery pack 10 shown in FIG. 2. The inner cover 42 seals a space in which the plurality of battery cells 12 are disposed within the battery pack case 18. For example, the inner cover 42 may be made of light metal, resin, or steel plate. The inner cover 42 includes a flange 422 formed around the perimeter. The inner cover 42 is fixed to the battery pack case 18 by aligning the flange 422 of the inner cover 42 with the floor surface of the battery pack case 18 and fastening both by fastener members. According to such a configuration, it is possible to reliably seal the space in which the plurality of battery cells 12 are accommodated by the inner cover 42.

1-3-7. Seventh Modification

The battery pack 20 is not limited to a configuration in which the plurality of battery cells 12 are accommodated, and may be a configuration in which one battery cell 12 is accommodated. The battery pack 20 in the third modification is not limited to a configuration for housing the plurality of battery cells 22 may be configured to accommodate one battery cell 22.

2. Second Embodiment

The second embodiment will be described with reference to the accompanying drawings. The mounting structure for the battery pack in vehicle of the second embodiment, except for the configuration of the first cushioning member 14 and the second cushioning member 16 is common to the mounting structure for the battery pack 10 in vehicle of the first embodiment. Therefore, in the second embodiment, elements common to those in the first embodiment are denoted by the same reference numerals, and overlapping descriptions are omitted or simplified.

2-1. Features of Mounting Structure for Battery Pack in Vehicle of Second Embodiment The plurality of battery cells 12, which are about 1 [m] in width, are housed in the battery pack 10. Thus, consider the case where a large battery pack 10 with a size of about 80% of the tread width of the vehicle 100 is fixed to the vehicle 100.

The load in the up-down direction input from the front wheels 104 or the rear wheels 106 of the vehicle 100 is mainly transmitted to the vehicle body 101 through the respective suspension mounts 108. Thus, when a torsional load is generated in the vehicle body 101, distortion occurs in the floor panel 102. The distortion of the floor panel 102 is also transmitted to the battery pack 10 which is fixed to the floor panel 102 as a torsional load. As described above, the plurality of battery cells 12 housed in the battery pack 10 has a size of about 1 [m] in the width direction. Therefore, when a torsional load is applied to these battery cells 12, a large distortion occurs in the width direction of the battery cell 12 may cause a failure.

Here, the plurality of battery cells 12 are sandwiched between the first cushioning member 14 and the second cushioning member 16. Therefore, it is possible to increase the effect of absorbing the distortion of the floor panel 102 as the rigidity of the first cushioning member 14 and the second cushioning member 16 is lowered. However, the first cushioning member 14 and the second cushioning member 16 is required to perform a fixing function of reliably fixing a plurality of battery cells 12. That is, the rigidity of the first cushioning member 14 and the second cushioning member 16 is constrained in terms of its fixing function.

In the mounting structure in vehicle of the second embodiment, the torsional load transmitted to the plurality of battery cells 12 is reduced by using a first cushioning member 54 and a second cushioning member 56, which are configured by changing the elastic properties of the first cushioning member 14 and the second cushioning member 16. Although the first cushioning member 54 is illustrated and described below, the same configuration can be applied to the second cushioning member 56.

Figure 10:
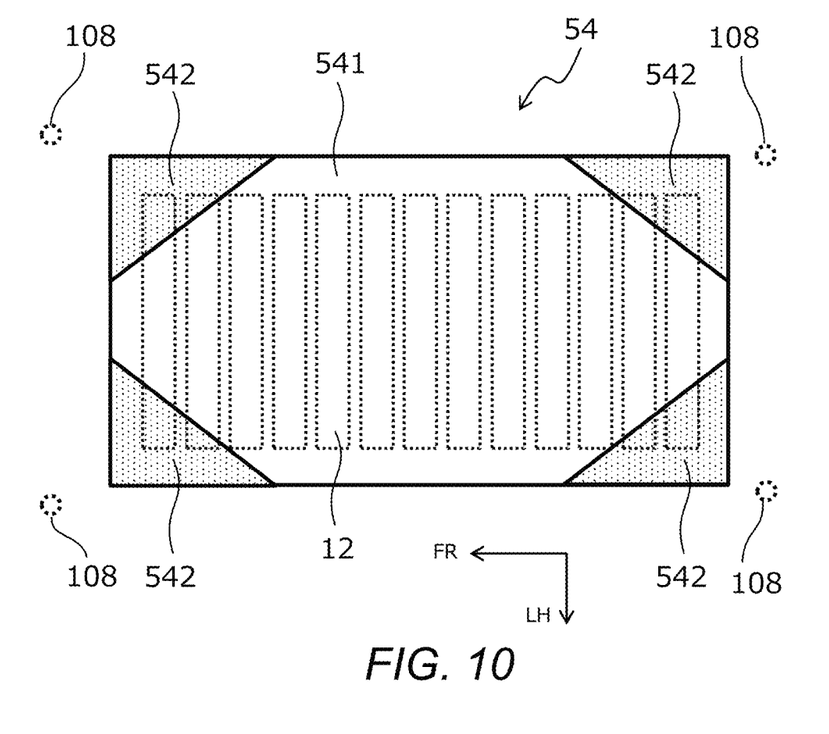
FIG. 10 is a top view for explaining a configuration of the first cushioning member used in the battery pack of the second embodiment.

FIG. 10 is a top view for explaining the configuration of the first cushioning member used in the battery pack of the second embodiment. In FIG. 10, the position where the plurality of battery cells 12 come into contact and the positions of the suspension mounts 108 are indicated by a chain line. As shown in FIG. 10, the first cushioning member 54 has a first area 541 and a second area 542 as a plurality of areas having different physical properties. The first area 541 is configured using the material of a first elastic modulus determined from the viewpoint of the fixing function of the plurality of battery cells 12. On the other hand, the second area 542 is configured using the material of a second elastic modulus which is determined from the viewpoint of the reduction function of the torsional load transmitted to the plurality of battery cells 12. The first elastic modulus is relatively higher than the second elastic modulus (e.g., 100 times). That is, the rigidity of the first area 541 is higher than that of the second area 542.

The locations of the first area 541 and the second area 542 are determined based on the positional relationship with the suspension mounts 108. That is, as shown in FIG. 10, the first cushioning member 54 has four areas closer from the four suspension mounts 108 as the second area 542 and an area farther from the suspension mounts 108 than the second area 542 as the first area 541. It is preferable that the first area 541 is an area including, for example, at least the entire area in the front-back direction in the center portion in the width direction of the first cushioning member 54 so as to contact at least all of the plurality of battery cells 12. The second area 542 is, for example, an area including at least four rectangular corners of the first cushioning member 54 and the periphery thereof. Boundary between the first area 541 and the second area 542 is adjusted based on the simulation results or the like relating to the vehicle body structure and load transmission of the vehicle 100 so as to be in a range satisfying at least the above constraints.

As described above, the torsional load to the vehicle body 101 is mainly input from the suspension tower corresponding to each of the front and rear wheels. For this reason, the distortion of the floor panel 102 around the suspension tower is relatively larger than the distortion of the floor panel 102 in the central portion of the vehicle body 101. According to the first cushioning member 54 of the second embodiment, the elastic modulus of the second area 542 corresponding to the floor panel 102 vicinity the suspension tower is smaller than that of the first area 541 corresponding to the central portion of the floor panel 102. Thus, for an area where the distortion of the floor panel 102 is relatively large, it is possible to absorb the distortion of the floor panel 102 by the second area 542 of the first cushioning member 54. Further, for relatively small area distortion of the floor panel 102, since the need to absorb distortion is relatively low, it is possible to reliably fix the battery cell by the first area 541 of the first cushioning member 54.

2-2. Modification Example of Mounting Structure for Battery Pack in Vehicle The mounting structure of the battery pack 10 in vehicle of the second embodiment may be modified as described below. Although several modified examples will be described below, these modified examples may have a structure in which they are appropriately combined. In addition, the mounting structure for the battery pack in vehicle of the first embodiment and its modification examples may also be appropriately combined.

2-2-1. First Modification

Figure 11:
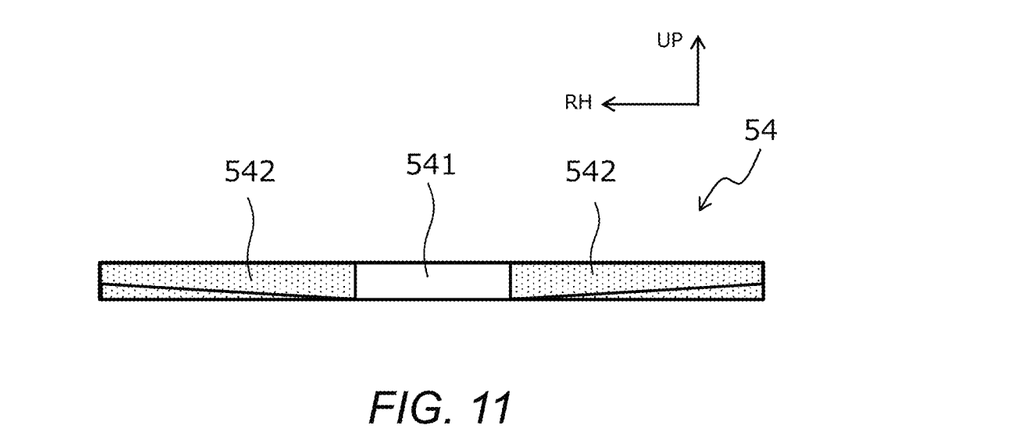
FIG. 11 is a side view of the first cushioning member of a first modification of the second embodiment as viewed from the front side in the front-back direction.

FIG. 11 is a side view of the first cushioning member of a first modification of the second embodiment as viewed from the front side in the front-back direction. As shown in FIG. 11, the second area 542 of the first cushioning member 54 may have a thickness that decreases toward the outer side in the width direction. The first cushioning member 54 is compressed sandwiched between the flat floor panel 102 and the flat contact surface of the battery cell 12. Therefore, in a steady state where no distortion occurs in the floor panel 102, the first cushioning member 54, toward the width direction outer side of the first cushioning member 54, i.e. as the thickness of the second area 542 is reduced, the amount of compression pressed by the battery cell 12 is reduced. According to such a configuration, it is possible to obtain the same effect as the configuration in which the elastic modulus of the second area 542 is gradually changed so as to decrease toward the outer side in the width direction within the range of the elastic deformation of the first cushioning member 54. Thus, it is possible to alleviate the stress concentration of the battery cell 12 at the boundary between the first area 541 and the second area 542. This modification can also be applied to the second cushioning member 56.

2-2-2. Second Modification

Figure 12:
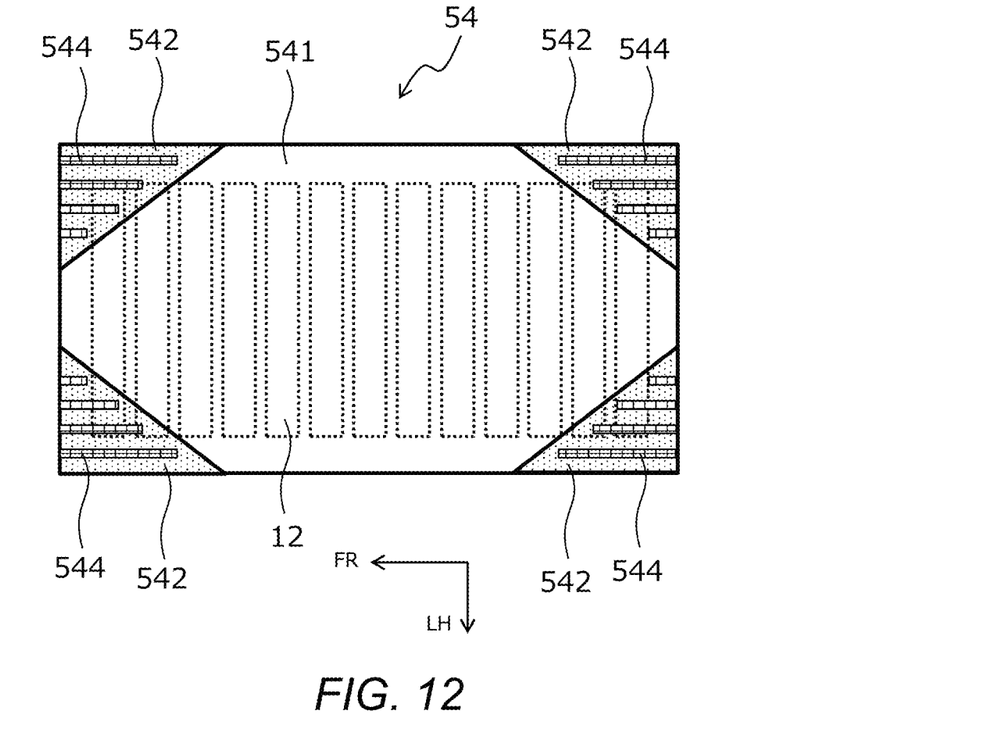
FIG. 12 is a top view of the first cushioning member of the second modification of the second embodiment as viewed from the upper side in the up-down direction.

FIG. 12 is a top view of the first cushioning member of the second modification of the second embodiment as viewed from the upper side in the up-down direction. In the second modification shown in FIG. 12, a common elastic material is used for the first area 541 and the second area 542 of the first cushioning member 54. A plurality of grooves 544 are formed in the second area 542. The plurality of grooves 544 may be penetrating or non-penetrating. According to the first cushioning member 54 having such a structure, since the average density of the second area 542 is lower than the average density of the first area 541, the rigidity of the second area 542 is relatively lower than the rigidity of the first area 541. Thus, even if an elastic material having a common material is used for the first area 541 and the second area 542, areas having different rigidity can be formed.

Figure 13:
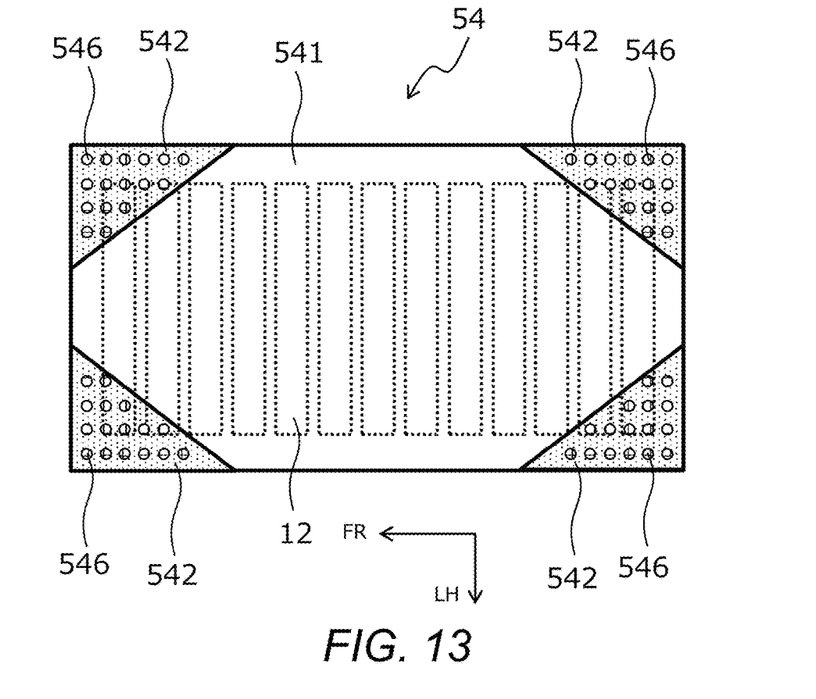
FIG. 13 is a diagram showing other example of the first cushioning member of the second modification of the second embodiment.

The shape and arrangement of the plurality of grooves 544 are not limited. Further, a plurality of holes 546 may be formed in the second area 542 instead of the plurality of grooves 544. FIG. 13 is a diagram showing other example of the first cushioning member of the second modification of the second embodiment. The plurality of holes 546 may be of a through type or a non-through type. The diameter and layout of the plurality of holes 546 are also not limited.

2-2-3. Third Modification

The second cushioning member 56 may be configured to have uniform rigidity as long as at least the first cushioning member 54 has a first area 541 and a second area 542. If the second cushioning member 56 has the same configuration as the first cushioning member 54 having the first area 541 and the second area 542, the first cushioning member 54 may be configured to have uniform rigidity.

3. Third Embodiment

The third embodiment will be described with reference to the accompanying drawings. The mounting structure for the battery pack in vehicle of the third embodiment, except for the structure for fixing the battery pack 10 to the floor panel 102 is common to the mounting structure for the battery pack 10 in vehicle of the first embodiment. Therefore, in the third embodiment, elements common to those in the first embodiment are denoted by the same reference numerals, and overlapping descriptions are omitted or simplified.

Figure 14:
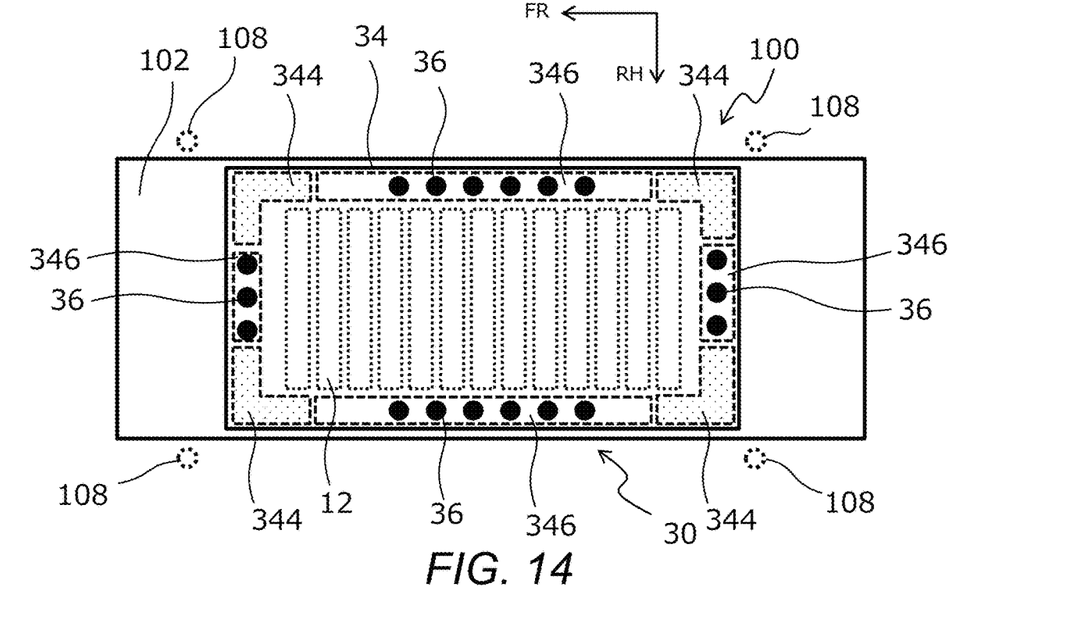
FIG. 14 is a diagram schematically showing a mounting structure for a battery pack in vehicle according to the third embodiment.

3-1. Features of Mounting Structure for Battery Pack in Vehicle of Third Embodiment FIG. 14 is a diagram schematically showing a mounting structure for a battery pack in vehicle according to the third embodiment. FIG. 14 shows a bottom perspective view of the mounting structure of the battery pack 30 shown in FIG. 7 schematically perspective from the lower side in the up-down direction of the vehicle. As shown in FIG. 14, a marginal part of the upper case 34 of the battery pack 30 is fixed to the floor panel 102 by a fixing structure 36. The fixing structure herein includes bolt fastening, welding, and adhesion.

The fixing structure 36 is fixed such that the fixation strength of a first marginal part 344, which is closer to the suspension mounts 108, is lower than the fixation strength of a second marginal part 346, which is further from the suspension mounts 108 than the first marginal part 344. Typically, the fixing structure 36 may be a structure in which the second marginal part 346 of the upper case 34 is fixed at one or a plurality of points by fastening bolts or the like, and the first marginal part 344 is not intentionally fixed. According to such a structure, in the first marginal part 344 corresponding to the rectangular four corners of the battery pack case 18, the torsional load transmitted from the floor panel 102 to the battery pack case 18 is effectively released. Thus, it is possible to reduce the distortion caused in the battery cell 12, which contributes to improving the reliability of the battery cell 12.

The fixing position and quantity by the fixing structure 36 are not limited to the embodiment shown in FIG. 14. That is, as long as the first marginal part 344 close to the suspension mounts 108 is avoided, the fixing position and quantity can be determined in consideration of the rigidity of the floor panel 102. Further, the mounting structure for the battery pack in vehicle according to the third embodiment is not limited to the case of being applied to the mounting structure of the battery pack 30 shown in FIG. 7. It can be applied to the mounting structure for the battery pack in vehicle, such as the battery pack 10 or the battery pack 20.

What is claimed is:

1. A mounting structure for a battery pack in a vehicle, the battery pack installing under a floor of the vehicle, the battery pack comprising:
   one or more battery cells;
   a battery pack case in which the one or more battery cells are disposed; and
   a cushioning member arranged to be sandwiched between the one or more battery cells and the floor or between the one or more battery cells and the battery pack case, by fixing the battery pack case to the floor,
   wherein the vehicle has one or more suspension mounts,
   wherein the cushioning member includes:
      a first area, and
      a second area closer to the one or more suspension mounts than the first area, and
   wherein the cushioning member is configured such that a rigidity of the second area is lower than a rigidity of the first area.

2. The mounting structure for the battery pack in the vehicle according to claim 1,
   wherein the cushioning member is configured in a rectangular shape extending in a front-back direction of the vehicle and a width direction of the vehicle,
   wherein the first area is an area including at least an entire area in the front-back direction in a central portion of the width direction, and
   wherein the second area is an area including at least four corners of the rectangular shape.

3. The mounting structure for the battery pack in the vehicle according to claim 1,
   wherein the cushioning member is configured such that an elastic modulus of a material in the first area is different from an elastic modulus of a material in the second area.

4. The mounting structure for the battery pack in the vehicle according to claim 1,
   wherein the cushioning member includes a plurality of grooves or holes in at least the second area, and
   wherein the cushioning member is configured such that an average density of the second area is lower than an average density of the first area.

5. The mounting structure for the battery pack in the vehicle according to claim 1,
   the battery pack case including:
      a lower case in which a plurality of battery cells including the one or more battery cells are arranged side by side; and
      an upper case for isolating a space in which the plurality of battery cells in the lower case are arranged,
   wherein the cushioning member is disposed between the upper case and the plurality of battery cells, and
   wherein the battery pack is fixed so that the upper case faces the floor.

6. The mounting structure for the battery pack in the vehicle according to claim 1,
   wherein the battery pack is configured in a rectangular shape in a bottom view of the vehicle,
   wherein the structure for mounting of the vehicle includes a fixing structure for fixing a marginal part of the battery pack to the floor,
   wherein the marginal part includes:
      a first marginal part, and
      a second marginal part farther from the one or more suspension mounts than the first marginal part, and
   wherein the fixing structure is configured such that a fixing strength of the first marginal part is lower than a fixing strength of the second marginal part.

7. The mounting structure for the battery pack in the vehicle according to claim 1,
   wherein a plurality of battery cells including the one or more battery cells are disposed with a gap between each other in a front-back direction of the vehicle.

8. The mounting structure for the battery pack in the vehicle according to claim 1,
   wherein a plurality of battery cells including the one or more battery cells are arranged stacked in an up-down direction of the vehicle.

* * * * *